(12) United States Patent
Stolarczyk

(10) Patent No.: US 6,549,012 B2
(45) Date of Patent: Apr. 15, 2003

(54) RADIO SYSTEM FOR CHARACTERIZING AND OUTLINING UNDERGROUND INDUSTRIAL DEVELOPMENTS AND FACILITIES

(76) Inventor: Larry G. Stolarczyk, 848 Clayton Hwy., Raton, NM (US) 87740

( * ) Notice: Subject to any disclaimer, the term of this patent is extended or adjusted under 35 U.S.C. 154(b) by 0 days.

(21) Appl. No.: 09/904,902

(22) Filed: Jul. 12, 2001

(65) Prior Publication Data

US 2003/0048104 A1 Mar. 13, 2003

Related U.S. Application Data

(60) Provisional application No. 60/296,401, filed on Jun. 7, 2001.

(51) Int. Cl.⁷ .............................. G01V 3/12; G01V 3/17; G01V 3/38; G01S 13/00
(52) U.S. Cl. ..................... 324/337; 324/329; 324/334; 324/344; 342/459
(58) Field of Search .................. 324/72, 326, 329, 324/330, 331, 334–337, 344; 342/22, 459

(56) References Cited

U.S. PATENT DOCUMENTS

| | | | |
|---|---|---|---|
| 3,351,936 A | * 11/1967 | Feder | 324/330 X |
| 3,831,173 A | * 8/1974 | Lerner | 324/337 X |
| 3,836,960 A | * 9/1974 | Gehman et al. | 324/337 X |
| 4,100,481 A | * 7/1978 | Gournay | 324/337 |
| 4,381,544 A | * 4/1983 | Stamm | 324/330 X |
| 4,577,153 A | 3/1986 | Stolarczyk | |
| 4,691,166 A | 9/1987 | Stolarczyk | |
| 4,706,031 A | * 11/1987 | Michiguchi et al. | 324/337 |
| RE32,563 E | 12/1987 | Stolarczyk | |
| 4,742,305 A | 5/1988 | Stolarczyk | |
| 4,753,484 A | 6/1988 | Stolarczyk | |
| 4,777,652 A | 10/1988 | Stolarczyk | |
| 4,814,711 A | * 3/1989 | Olsen et al. | 324/331 |
| 4,879,755 A | 11/1989 | Stolarczyk | |
| 4,951,055 A | * 8/1990 | Katayama | 324/337 X |
| RE33,458 E | 11/1990 | Stolarczyk | |
| 4,968,978 A | 11/1990 | Stolarczyk | |
| 4,994,747 A | 2/1991 | Stolarczyk | |
| 5,066,917 A | 11/1991 | Stolarczyk | |
| 5,072,172 A | 12/1991 | Stolarczyk | |
| 5,087,099 A | 2/1992 | Stolarczyk | |
| 5,093,929 A | 3/1992 | Stolarczyk | |
| 5,121,971 A | 6/1992 | Stolarczyk | |
| 5,146,611 A | 9/1992 | Stolarczyk | |
| 5,181,934 A | 1/1993 | Stolarczyk | |
| 5,188,426 A | 2/1993 | Stolarczyk | |
| 5,260,660 A | 11/1993 | Stolarczyk | |
| 5,268,683 A | 12/1993 | Stolarczyk | |
| 5,301,082 A | 4/1994 | Stolarczyk | |
| 5,408,182 A | 4/1995 | Stolarczyk | |
| 5,474,261 A | 12/1995 | Stolarczyk | |
| 5,686,841 A | 11/1997 | Stolarczyk | |
| 5,757,283 A | * 5/1998 | Janoska | |
| 5,769,503 A | 6/1998 | Stolarczyk | |

* cited by examiner

Primary Examiner—Gerard R. Strecker
(74) Attorney, Agent, or Firm—Richard B. Main

(57) ABSTRACT

Most mines and underground facilities employ standardized construction techniques and materials. Such also cannot avoid having some above ground openings to receive utilities, fresh air, supplies, etc. Those or other surface openings are also universally used to discharge ground water, wastes, and other materials. Typical underground facilities have abundant electrical wiring and power demands, both of which can be detected at the surface. Levees with leakage pathways also form electrical conductors. When properly illuminated with remotely generated electromagnetic (EM) radiation, many of these features will "glow" or reradiate the radio energy in an electronic signature unique to the underground facility. Synchronized EM-gradiometer transponders are situated nearby on the ground surface to collect and analyze the "glow". Alternative transmitting devices further includes ways to generate the illumination, and computers for characterizing the return signatures.

18 Claims, 4 Drawing Sheets

RADIO SYSTEM FOR CHARACTERIZING AND OUTLINING UNDERGROUND INDUSTRIAL DEVELOPMENTS AND FACILITIES

This application claims the benefit of provisional application No. 60/296,401, filed Jun. 7, 2001.

BACKGROUND OF THE INVENTION

1. Field of the Invention

The invention relates generally to non-invasive methods and systems for probing the earth, and more specifically to radio instruments that can image and detect objects and other anomalies in the ground. Leakage pathways in levee and earth dams is an example of an anomaly that cannot be seen by surface observation.

2. Description of the Prior Art

Underground facilities cannot totally disappear from the surface the way modern submarines can beneath the sea. Many reasons exist for finding underground facilities, e.g., law enforcement needs to be able to detect and assess illegal tunnels bored under international borders by drug smugglers. There is generally a lack of primary access to such underground facilities, so methods need to be developed that can collect and recognize the telltale signs.

For many reasons, the worldwide mining industry has developed a standard practice that results in electrical conductors being installed in the adit and passageways of underground industrial developments and facilities. Recent work in developing mine-wide radio system equipment has shown that the electrical conductors form a low attenuation rate network, or waveguide, for electromagnet (EM) wave distribution into and throughout the complex. Leakage pathways through clay bearing soil also form electrical conductors. Deliberate or fortuitous EM-wave generators can induce currents in such conductors. Deliberate EM-wave generators can be deployed to the survey site, while fortuitous ones already illuminate the site with spurious signals.

Much of the relevant background art is documented in the many United States Patents of the present inventor, Larry G. Stolarzyck. Such Patents are listed in Table I, and are incorporated herein by reference.

TABLE I

| Patent No. | Issued | Title |
| --- | --- | --- |
| US 04577153 | 03/18/1986 | Continuous Wave Medium Frequency Signal Transmission Survey Procedure For Imaging Structure In Coal Seams |
| US 04691166 | 09/01/1987 | Electromagnetic Instruments For Imaging Structure In Geologic Formations |
| US 04742305 | 05/03/1988 | Method For Constructing Vertical Images Of Anomalies In Geological Formations |
| US 04753484 | 06/28/1988 | Method For Remote Control Of A Coal Shearer |
| US 04777652 | 10/11/1988 | Radio Communication Systems For Underground Mines |
| US 04879755 | 11/07/1989 | Medium Frequency Mine Communication System |
| US 04968978 | 11/06/1990 | Long Range Multiple Point Wireless Control And Monitoring System |
| US 04994747 | 02/19/1991 | Method And Apparatus For Detecting Underground Electrically Conductive Objects |
| US 05066917 | 11/19/1991 | Long Feature Vertical Or Horizontal Electrical Conductor Detection Methodology Using Phase Coherent Electromagnetic Instrumentation |

TABLE I-continued

| Patent No. | Issued | Title |
| --- | --- | --- |
| US 05072172 | 12/10/1991 | Method And Apparatus For Measuring The Thickness Of A Layer Of Geologic Material Using A Microstrip Antenna |
| US 05087099 | 02/11/1992 | Long Range Multiple Point Wireless Control And Monitoring System |
| US 05093929 | 03/03/1992 | Medium Frequency Mine Communication System |
| US 05121971 | 06/16/1992 | Method Of Measuring Uncut Coal Rib Thickness In A Mine |
| US 05146611 | 09/08/1992 | Mine Communication Cable And Method For Use |
| US 05181934 | 01/26/1993 | Method For Automatically Adjusting The Cutting Drum Position Of A Resource Cutting Machine |
| US 05188426 | 02/23/1993 | Method For Controlling The Thickness Of A Layer Of Material In A Seam |
| US 05260660 | 11/09/1993 | Method For Calibrating A Downhole Receiver Used In Electromagnetic Instrumentation For Detecting An Underground Conductor |
| US 05268683 | 12/07/1993 | Method Of Transmitting Data From A Drillhead |
| US 05301082 | 04/05/1994 | Current Limiter Circuit |
| US 05408182 | 04/18/1995 | Facility And Method For The Detection And Monitoring Of Plumes Below A Waste Containment Site With Radiowave Tomography Scattering Methods |
| US 05474261 | 12/12/1995 | Ice Detection Apparatus For Transportation Safety |
| US 05686841 | 11/11/1997 | Apparatus And Method For The Detection And Measurement Of Liquid Water And Ice Layers On The Surfaces Of Solid Materials |
| US 05769503 | 06/23/1998 | Method And Apparatus For A Rotating Cutting Drum Or Arm Mounted With Paired Opposite Circular Polarity Antennas And Resonant Microstrip Patch Transceiver For Measuring Coal, Trona And Potash Layers Forward, Side And Around A Continuous Mining Machine |
| USRE032563 | 12/15/1987 | Continuous Wave Medium Frequency Signal Transmission Survey Procedure For Imaging Structure In Coal Seams |
| USRE033458 | 11/27/1990 | Method For Constructing Vertical Images Of Anomalies In Geological Formations |

SUMMARY OF THE PRESENT INVENTION

Briefly, a method embodiment of the present invention finds underground mines, tunnels, shafts and leakage pathways from above ground electronic measurements by assuming they will be built or occur in a particular way and decorated with a variety of standard features. Concrete reinforcing bar, rails, pipes, and wire cables are assumed to coexist. When illuminated by radio waves that penetrate the ground, these conductive metals will reradiate secondary electromagnetic signals that can be observed on the surface. Radio signal measurements collected above ground are combined into pictures and estimates of the scope, orientation, nature, and character of the underground structures. Changes over days, weeks, months, and years can be interpreted as being the result of deterioration, damage, upgrades, expansion, new construction, design changes, etc.

An advantage of the present invention is that a method for imaging underground facilities is provided that can use opportunistic sources of radio illumination.

Another advantage of the present invention is that a system for imaging an underground facility can be dropped in and results can be read in real-time.

A further advantage of the present invention is that a system for imaging an underground facility can be mounted in a car, operated passively, and the results can be read in real-time.

These and other objects and advantages of the present invention will no doubt become obvious to those of ordinary skill in the art after having read the following detailed description of the preferred embodiment which is illustrated in the various drawing figures.

IN THE DRAWINGS

DETAILED DESCRIPTION OF THE PREFERRED EMBODIMENTS

Figure 1:
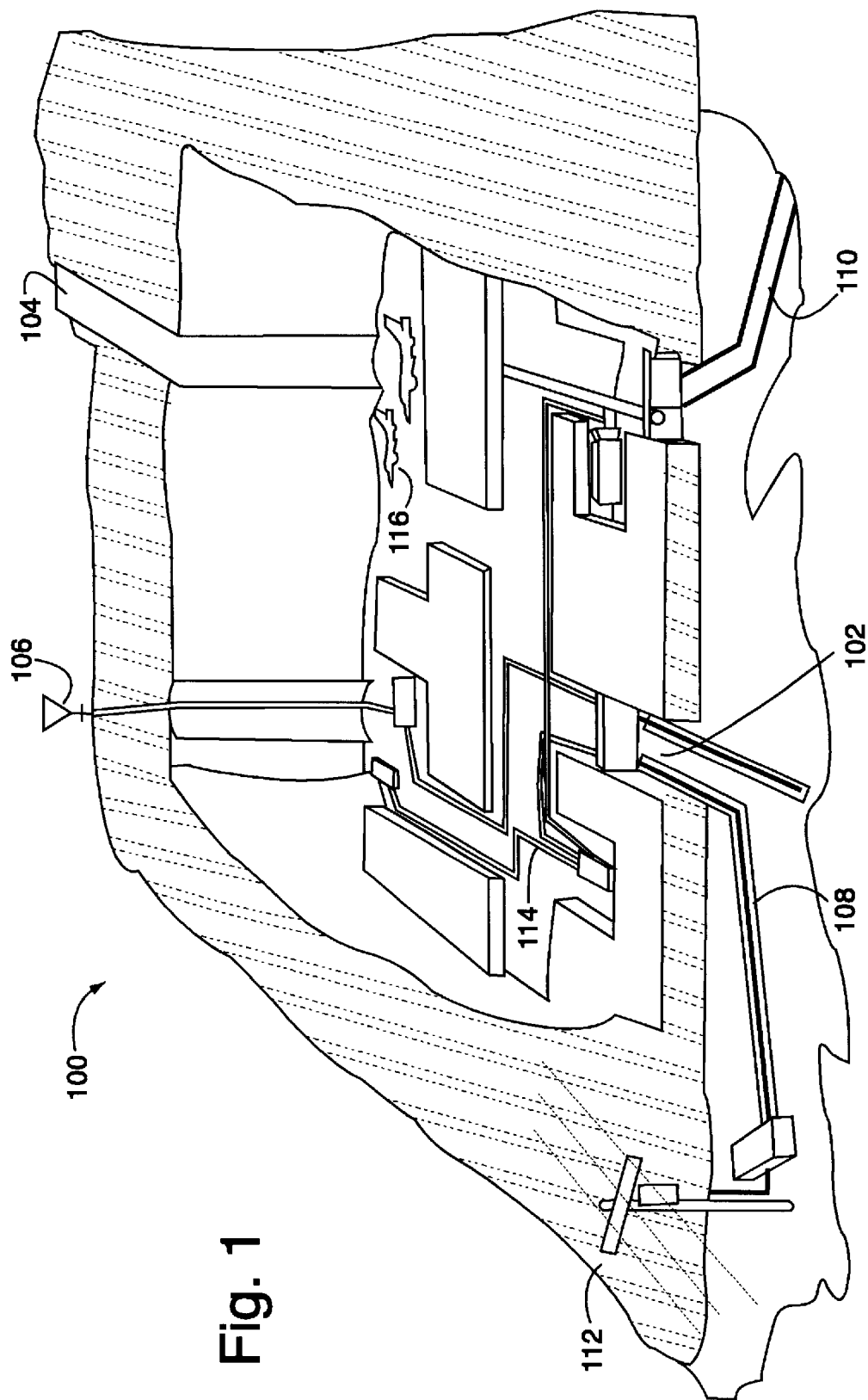
FIG. 1 is a cut-away perspective diagram of an exemplary underground facility susceptible to assessment by surface equipment using method embodiments of the present invention.

FIG. 1 represents an exemplary underground facility (UGF) 100, which is built according to conventional underground mining practice. In some of the more interesting applications contemplated, the UGF 100 is not accessible to the investigator, and its very existence may even be unknown. The challenges to be addressed by embodiments of the present invention are (1) to discover the existence of UGF 100, and (2) to characterize its size, orientation, function, and operational purpose. Measurements taken over time, and compared, further allow assessments of changes in the UGF 100 in other embodiments of the present invention.

The UGF 100 of FIG. 1 comprises an adit (entrance) 102, a ventilation shaft 104, an above-ground radio antenna 106, power-feed cables 108, train rails 110, outside utility transmission lines 112, internal power distribution cables 114, and vehicles 116. Many of these features are unavoidable, and very hard to conceal, especially from electronic scanning. For example, an electromagnetic (EM) gradiometer as described in connection with FIG. 2 can be used with good results.

There is a universal similarity amongst all kinds of underground facilities around the world. In part, this stems from the small number of academic institutions that educate and train the world's mining engineers, geologists, and geophysicists. The same curriculum and textbooks are subscribed to by most all the leading schools. Otherwise disperse members of the world mining community are also drawn together by trade associations and trade shows. For example, the 18$^{th}$ International Conference on Ground Control in Mining that was recently held at West Virginia University (WVU), and also the annual meetings of the Society of Mining Engineering allow for a lot of professional networking.

The technical specializations employed in the construction of UGF 100 include mine design, ground control, ventilation, drainage, electrical design, conveyers, transport systems, geology, and geophysics. Governments have enforced standardization in mining practice through various health and safety regulations. Such regulations have their roots in basic lessons learned from mine disasters around the world. Some governments go so far as to encourage their domestic equipment manufacturers to export machinery for the worldwide mining market. Indeed, mining machines that are proven to be reliable in their domestic markets will find ready export markets. These factors result in underground facility construction that is consistent in all countries.

The typical underground facility 100 in FIG. 1 has many surface features and outcroppings. So all the "looking" to find and characterize UGF 100 is not done underground. The above ground features are distinctive and telltale. Because construction engineering and building are so standardized, the clues left at the surface are very often reliable indicators of what is going on underground. A database of these observations and their interpretations is kept in a library for comparison later with measurements taken at a remote field site.

In a typical construction, geologic core samples are taken and analyzed so the appropriate mining excavation plan and mining equipment can be selected. Plans and specifications are written for ground control, ventilation, muck transportation, drainage, power, and telephone systems.

Typical cut-and-fill construction disrupts the surface vegetation when the overlying soil is temporarily moved aside. Localized disturbances in surface vegetation can signal the location of UGF 100, even years after the overlying soil has been returned and attempts made to replant the site. Because the weight of the material overhead is substantial, the roof must be massive and strong enough to support it. So steel support beams and concrete reinforcing steel mats are used and these, in turn, are EM-observable.

For example, the Cloud Chamber at the Department of Energy (DOE) Nevada Test Site (NTS) is constructed with steel arch supports and includes shallow-buried electrical conductors to instrument nearby underground nuclear tests. A variety of EM-wave sources can easily induce current flow in such umbilical conductors. The site's magnetic anomaly is so large, a hand-held compass will deviate over the structure.

Many different kinds of underground structures use reinforced concrete, and the steel reinforcing is very easy to image electronically with ground penetrating radar. Drug smuggling tunnels in the Nogales, Ariz., area would collapse if it were not for its aggressive ground control measures. Structures developed into hard rock have similar ground control requirements. Weathering at the adits can make the ground incompetent. Aggressive use of steel/wood supports along with metal screening is required, and reinforced concrete is commonly used in the construction of adits. As the entries are developed, ground control measures intensify with strata depth and with the width of the entry. Mines driven into schists use roof bolts and metal screening to cross through faults. Roof rock falls can be detected seismically with geophones. Such microseismic devices can be integrated into an EM-gradiometer for long-term monitoring.

The preferential use of pneumatic drills in mines means that a network of high pressure metal pipes must be installed to supply the compressed air. Such pipe network will reradiate electromagnetic waves as well as power cables and railroad rails. The drills and the blasting with explosives in mines also means seismic and sound detectors can be used to detect activity, especially new construction.

The tunnel boring machines (TBM) used by such operations are specialized equipment that can be tracked by commerce officials. The sale and delivery of TBM's can signal that a new search could turn up UGF 100 and provide some preliminary information on where to look.

A shallow-buried tunnel was recently detected by the odd way snow melted overhead on the surface along the center line of the tunnel. Such tunnel used wood-support ground-control measures to build the tunnel. Other nearby tunnels were driven into schist with drill-and-blast methods. Evidence suggested that rail was used for muck transport. Lighting brackets were seen on the ribs (walls) of the tunnel, and their electrical conductors were EM-observables on the surface.

Mining engineers expect water will most likely be encountered in developing entries, and so mines are developed upgrade to naturally dewater the workings. The mine drainage water therefore exits UGF 100 at an adit. In sulfide-bearing rock mass, the drainage water will be acidic, and discolor the surface soil and retard vegetation. Such water may form an electrical conductor.

Bacteria of two types always seem to be associated with mine ventilation. When sufficient oxygen is present, the relatively warm and moist underground environment fosters rapid accumulation of aerobic bacteria strains. But in the poorly or not ventilated areas, carbon dioxide (black damp) builds up, and anaerobic bacteria grows rapidly. Septic conditions can also generate hydrogen sulfide and methane.

Mine ventilation engineers try to drive fresh air through the mine's entries and into the working areas with a "primary fan" that is located as near the adit as possible, e.g., in an air door. Overpressure is typically generated by the primary fan in the mining complex to push air out the exhaust vents at the deep end of the complex. Sometimes air ducts are used to carry fresh air to the working area, and the used air exits at the adit. The ventilation system may also be designed around an exhaust fan system. Some ventilation tubing includes electrically conductive spiral wire that can reradiate signals that are observable on the surface with EM-detectors.

Large underground mines and other facilities have trouble maintaining adequate air ventilation, so lots of small fans will usually be found to assist the main fans. Three-phase electric utility power is generally required for big ventilation fans because of the large horsepower electric motors they use. The smaller fans are usually connected to single-phase power.

In remote areas, diesel and propane gensets are used because bringing in a utility transmission line 112 is not practical. The power cables depended on to supply the fans can be expected to radiate secondary EM-waves and also waveguide the primary EM-waves deeper into the lower parts of the underground facility.

Mine fires typically advance in the direction of the fresh-air source "intake", and may generate many observables that can be watched for. Carbon monoxide monitors are very often used at the vents to detect mine fires that are just getting started. Tracer gas may be injected at the adits to locate exhaust vents. A LIDAR-beam from a standoff platform, like an airplane, can be used to sense carbon monoxide at the mine vents.

A non-toxic "stench" gas is conventionally injected into the ventilation system to signal mine personnel there is an emergency and to get out. A UGF 100 in serious trouble can be inferred by the people evacuating, e.g., along predesignated escape paths.

The electrical power and telephone design practice is dictated by universal health and safety regulations, and differ for gassy and non-gassy mines. In non-gassy mines, electrical transformers and switches are designed to surface standards. However, in gassy mines, flameproof enclosures are designed around these electrical apparatus.

In Third World countries, three-phase power wires entering the complex are distributed in three separate conductors that run in parallel along the rib (side) of the drift. This is because jacketed three-phase cables as used in the US and Europe are too expensive and difficult to get. Such wiring promotes low-attenuation rate monofilar and bifilar EM-wave propagation in the mine. Since these conductors traverse most of the mine entries, any induced radio signal current flow results in secondary waves that can be used to determine the orientation of entries in the UGF 100.

Proper electrical grounding in UGF 100 is exceedingly important, but it is difficult to maintain a single continuous grounding conductor throughout any mine. When a grounding wire is damaged or fails, the safety circuit breakers may not trip if a motor fault occurs. So each load has its own ground wire run to it, and these ground wires fan out throughout the mine.

Mining machines induce unique current flows in these ground wires, and the signal radiates as an EM-observable. For example, induction motors during startup cause a triangular-shaped ground current to flow. A Fourier series representation of induced current includes odd harmonics that decay as the inverse square of the odd harmonic number, e.g., albeit an electronic signature. There is also a strong component at the induction motor slip frequency. By monitoring the slip frequency, motor loading can be determined. Three-phase rectifiers also generate strong harmonics that decay as the inverse first power of the harmonic number. In general, the mine-generated electrical noise density spectrum below 100 KHz increases as the inverse power of frequency. An EM-gradiometer can be set advantageously to search for such power system-induced harmonics.

Current flow in buried electrical conductors induced by the primary EM-waves generates cylindrically spreading secondary waves that have a predictable decay over distance. These secondary EM-waves pass through surrounding rock masses and may be measurable on the surface by sensitive receivers. Information about an underground industrial development and facility can be pieced together from the radio signal observables, e.g., infrastructure orientation, burial depth, and the location of any active adits, accesses, or other pathways and passageways. An unknown resistivity of the overlying geologic material can skew the readings, so classifying the kind of rock mass helps minimize such errors. Changes in the observed signals over time can be used to assess deterioration, damage, upgrades, expansion, new construction, design changes, etc.

Low frequency electromagnetic waves can be deliberately generated by interacting with the polar electrojet, a naturally occurring current in the magnetosphere flowing at auroral latitudes. These currents originate at E-layer altitudes, approximately one hundred km, and often exceed a million amperes. The current is distributed within a one hundred km wide sheet, so the current density at any given point is low. The latitudes at which the polar electrojet is overhead is dependent on the time of day, the current flows in a circle concentric to the magnetic pole. So the polar electrojet is tilted relative to the north pole.

The southern extent of the polar electrojet changes according to solar storm activity. It recedes to the north as the geomagnetic field gets quieter. The current can change direction too, e.g., flowing east-to-west or west-to-east.

The electrical conductivity in a small part of the layer in which the electrojet flows can be manipulated, e.g., a few tens of kilometers. Polar electrojet current flowing through the affected volume will be attenuated and steered to other unaffected parts. When the stimulation is removed, the electrojet currents return to their natural distributions. The rate at which the conductivity can be modulated is limited, and therefore the carrier frequency of the radio waves that can be generated is constrained. Under typical ionospheric conditions, this frequency is near 2.8 MHz. At best, frequencies of 2–3 KHz can be generated, but the signal level measured on the ground is very small, e.g., 1–3 picoTeslas in the extreme low frequency (ELF) band. Special purpose correlating receivers are usually needed to detect such weak signals. Out of the million amperes naturally flowing in the electrojet, only about one ampere can be influenced to generate a useful signal.

Figure 2:
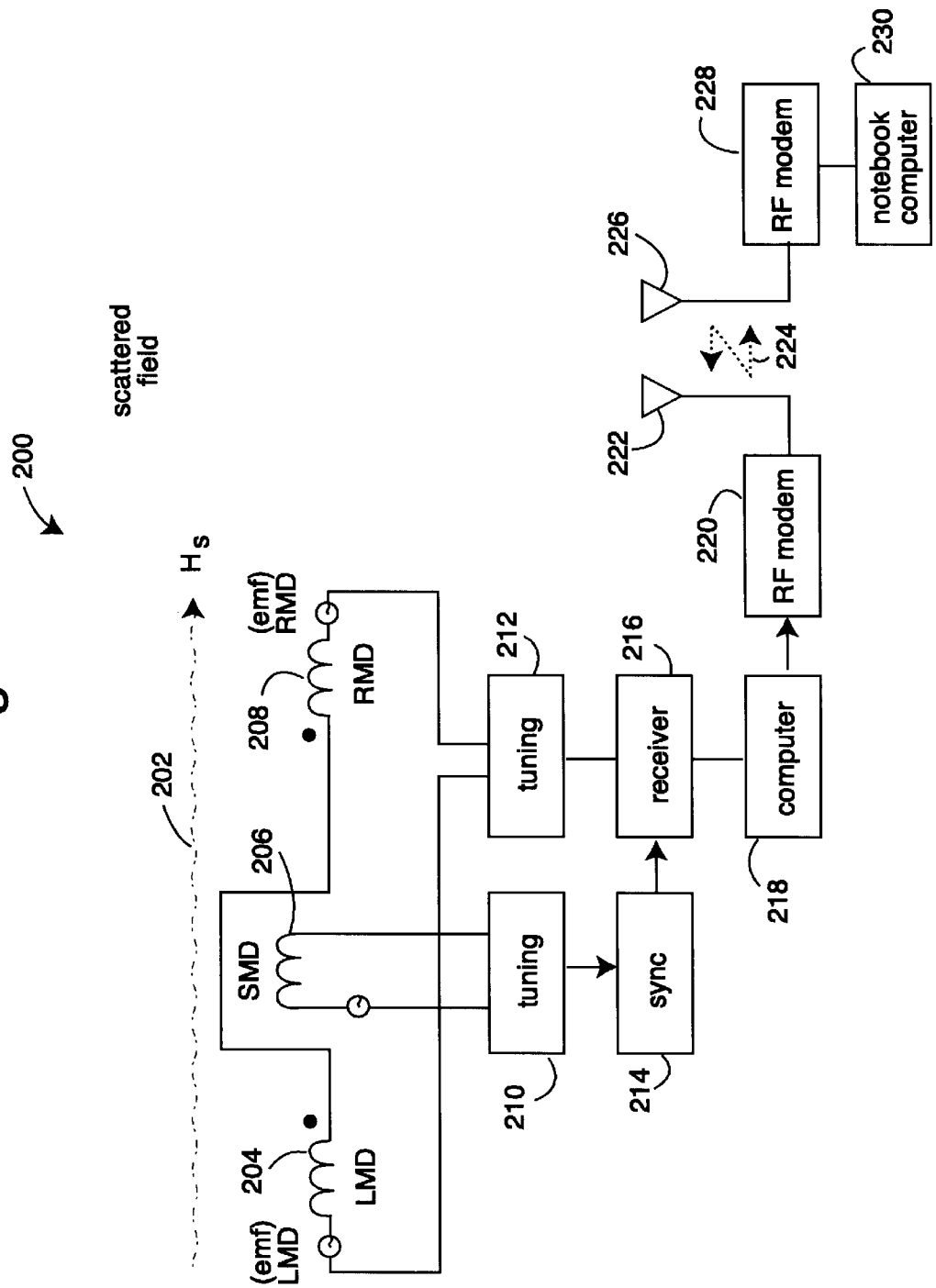
FIG. 2 is a schematic diagram of an EM-gradiometer embodiment of the present invention.

FIG. 2 represents a synchronous electromagnetic (EM) gradiometer instrument embodiment of the present invention, and is referred to herein by the general reference numeral 200. The EM-gradiometer 200 is preferably used proximate to a scattered field (Hs) 202, e.g., as reflected from UGF 100. A left-hand magnetic dipole (LMD) antenna 204 is arrayed with a synchronous magnetic dipole (SMD) antenna 206 and a right-hand magnetic dipole antenna 208. The SMD antenna 206 is connected to a tuning circuit 210. A tuner 212 is connected to the LMD and RMD antennas 204 and 208 in series. A synchronizer 214 is connected to a synchronous receiver 216 and is thus able to detect phase shifts in the received reflected signals. A computer 218 is used to collect and organize the EM-observables and ships the results out through an RF modem 220. A transmitter antenna 222, a radio communication link 224, and a receiver antenna 226 are received by another RF modem 228. A notebook processor 230 includes an application program that helps a user interpret and view conclusions and insights that can be garnered from the EM-observables and any a priori database information that is relevant.

A method embodiment of the present invention for detecting and characterizing underground man-made structures, facilities and levees comprises first defining a minimum set of construction features common to all members of a class of underground man-made structures, facilities and levees. These can be cataloged into a database, at least one of an electronic signature and a photographic signature for each of the construction features in accessible members of the class of underground man-made structures and facilities. Radio illumination of such construction provides reflected signals that are collected above ground. The measurements are compared with an electronic signature or photographic signature stored in the catalog. The location, depth, orientation, nature of overburden, and type are deduced for the inaccessible underground man-made structure, facility or levee.

The method can further include deploying a radio transmitter above ground proximate to the inaccessible underground man-made structure, facility or levee. Receivers may be tuned to signals being transmitted from unrelated broadcasters. The step of defining may include in the set of construction features at least one of adits, piping, wiring, ventilation systems, electrical power distribution, telephones, computers and conductive water pathway. The method can further comprise the step of estimating a location of an adit with utilities that serve the inaccessible underground man-made structure or facility, or imaging the inaccessible underground man-made structure or facility, or telemetering a plurality of measurements obtained in the step of collecting to a remote site for assessment of the inaccessible underground man-made structure or facility, or disabling the inaccessible underground man-made structure or facility based on information developed in the step of deducing.

The step of depending on radio illumination may include using primary electromagnetic (EM) waves, and collecting above-ground a reradiation of radio signals comprising secondary EM-waves polarized opposite to the primary EM-waves. The step of depending on radio illumination may include waveguide signal distribution effects of electrical conductors entering adits to the inaccessible underground man-made structure or facility, or the step of depending includes opportunistic use of picoTelsa-range primary electromagnetic (EM) waves at the inaccessible underground man-made structure or facility generated by the High Frequency Active Aurora Research Project (HAARP) low frequency modulation of Earth's polar electrojets.

The steps of collecting, comparing, and deducing can produce in real-time at least one of a location, depth, orientation, nature of overburden, and type for the inaccessible underground man-made structure or facility. The method may further include assessing changes that occur over time in at least one of the location, depth, orientation, nature of overburden, and type for the inaccessible underground man-made structure, facility or pathway that are obtained in the step of deducing. Opportunistic standoff radio sources can be used that reach the inaccessible underground man-made structure or facility with at least picoTesla signal power levels.

EM detection and imaging of UGF 100 depends on induced radio currents in mine passageway electrical conductors, the rebar in reinforced concrete and electrically conductive water pathways. R. F. Harrington developed a simple formula for the induced current (I) in long, thin electrical conductors when illuminated by the electric field component (E) of the EM-wave. (*Time-Harmonic Electromagnetic Fields*, McGraw-Hill, Inc. New York, 1961, pp.233–234.) The total current (I) is given in formula (1), $$I = \frac{2\pi E}{i\omega\mu\log ka} \quad (1)$$

where, $\omega = 2\pi f$ and f is the frequency in Hertz of the primary EM-wave, $\mu = \mu_o \mu_r$ is the magnetic permeability of the surrounding rock mass and $\mu_o = 4\pi \times 10^{-7}$ Henrys per meter and $u_r = 1$ in most natural media, $k = \beta - i\alpha$ is the wave propagation constant where $\beta$ is the phase constant and $\alpha$ is the attenuation rate, and a = the radius of the conductor in meters.

This fundamental equation is applied in an active EM method of detection of UGF 100. For a thin electrical conductor in a tunnel, the equation teaches that the induced current increases with the amplitude of primary EM-wave electric field component that is tangential to the electrical conductor and inversely with frequency ($\omega$). Therefore, lower frequency EM-waves are preferable and compatible with the HAARP transmitter electrojet modulation capability and other standoff opportunistic sources that utilize the earth-ionosphere waveguide. Actual measurements conducted at the Colorado School of Mines (CSM) BRDEC tunnel proved that induced current given Equation (1) increased as frequency decreased. For a magnetic dipole source, the longitudinal electric field component is given by $$E_\phi = \frac{i\mu\omega Mk^2}{4\pi}\left[\frac{-1}{(kr)^2} + \frac{1}{i(kr)}\right]e^{-ikr}\sin\phi \qquad (2)$$

where, M=NIA is the magnetic moment (turn peak ampere square meters), and $\phi$ is azimuth angle in degrees.

Because of the $\omega$ term in the above equation, the electric field vanishes at zero frequency. There is an optimum frequency for inducing maximum current for magnetic dipole sources. Primary EM-waves that propagate in earth-ionosphere waveguide signals are quasi-transverse EM-waves (TEM) which produce uniform illumination of the UGF 100. In the case of a waveguide TEM-wave, the magnitude of electric field is not frequency dependent as in the case of the magnetic dipole source.

Harrington goes on in his formulation to show that the secondary EM-wave scattered from the electrical conductor will slow decay with distance from the conductor at radial distances that are large compared with the skin depth. M. L. Burrows also develops similar formulations as $$H_s = \frac{iI_s k}{4} H_1^{(2)}(kr), \text{ and} \qquad (3)$$

$$Es = -Z\frac{\omega\mu I}{4}H_0^{(2)}(kr) \qquad (4)$$

where $\phi$, Z are unit vectors, $H_0^{(2)}$, $H_1^{(2)}$ are Hankel functions of the second kind (order 0 and 1), and r is the radial distance in meters to the measurement point. (*ELF Communications Antennas*, Peter Peregrins Ltd., Southgate House Stevenage, England, 1978.)

At radial distances that are large compared with the skin depth, the asymptotic formula of the Hankel function leads to simplified expressions:

$$Hs \approx \Phi\frac{I_s}{2}\left(\frac{ik}{2\pi r}\right)^{\frac{1}{2}}e^{-ikr} \text{ and} \qquad (5)$$

$$Es \approx -Z\frac{\omega\mu Is}{2}\left(\frac{i}{2\pi kr}\right)^{\frac{1}{2}}e^{-ikr}. \qquad (6)$$

The secondary cylindrically spreading EM-waves decay with the half power of distance (r) from the conductor. They are decreased in magnitude by the attenuation factor $e^{-\alpha r}$. A gradiometer antenna is designed to measure the gradient of the cylindrical spreading EM-wave. The reception of secondary EM-waves in the rock mass surrounding the tunnel or on the surface confirms the existence of nearby electrical conductors.

David Hill reformulated the problem for the case of finite length conductors and non-uniform illumination by a magnetic dipole source. ("Nearfield and Farfield Excitation of a Long Conductor in a Lossy Medium", report NISTIR-3954, National Institute of Standards and Technology, Boulder, Colo., 1990.) In this case, standing waves occur on the underground conductors. In a passageway with multiple conductors, the standing wave pattern is not observable because of multiple reflections in the ensemble of electrical conductors.

Bartel and Cress used forward modeling codes developed by Gregory Newman to show that current flow is induced in reinforced concrete. ("An Electromagnetic Induction Method for Underground Target Detection and Characterization", Sandia Report SAND97-0054, January 1997.) Forward modeling codes are now available to determine UGF 100 response for EM sources above and below the earth's surface.

Wait and Hill have theoretically shown that the passageway conductors form low attenuation rate transmission networks (waveguides) for distribution of induced current throughout the UGF 100. ("Excitation of Monofilar and Bifilar modes on a Transmission Line in a Circular Tunnel", *J. Applied Physics*, vol. 45, pp. 3402–4356, 1974.)

The attenuation rate is typically less than 1.0 dB per kilometer at 50 KHz. The passageway conductors essentially create an induced current distribution network throughout the UGF 100. The current appears on the electric power and telephone cables entering the complex through any adits. Switches will not disrupt all the induced current flow because the grounding conductors are never switched. However, open switches and any isolation transformers can attenuate the signal.

The total field is the sum of the primary and secondary field. Usually the total field changes by only a few percent, but the gradient changes by tens of percent when an EM-gradiometer is passed over a conductor. If quasi-TEM earth-ionosphere waveguide signals are used, EM-waves couple across the air-soil boundary and propagate downward. The attenuation rate ($\alpha$) and phase shift ($\beta$) for a uniform plane wave propagate in natural medium with a typical relative dielectric constant of ten. The propagation constant can be estimated for various types of natural media.

The electrical conductivity of most natural media increases with frequency. The lower frequency signal attenuation rate decreases from high frequency values, so deeper targets may be detected using lower frequencies. Ground-penetrating radar technologies are inappropriate to find UGF 100, at one hundred MHz in a $10^{-1}$ S/m media, the attenuation rate is too great. It's about 39 dB per meter, and such prevents receiving minimum signals at surface.

One advantage of the EM-gradiometer is that it can be used on the surface. Radiowave interference from distant sources will be plane waves and are suppressed by the gradiometer antenna. The gradiometer measurement of tunnel and UGF 100 response exhibits a high signal-to-noise (signal-to-noise) ratio-favorable for reducing the false alarm rate (FAR).

EM-gradiometer receivers have been able to detect scattered secondary waves from a USGS seismology vault near Kirtland Air Force Base (KAFB), the Cloud Chamber at the Nevada Test Site (NTS), and the Yucca Mountain Tunnel. The seismology vault near KAFB was developed into a granite outcrop.

One EM-gradiometer instrument embodiment of the present invention was designed to receive very small magnitude HAARP electrojet signals at the earth's surface. The signal spectrum exhibited minimum values in several frequency bands. HAARP research projects have generated signal below 1.0 KHz where the electrojet signals are measured in the picoTesla range, e.g., Tesla=Weber per square meter. A gradiometer designed to operate in the 9.0 KHz frequency range operates in a noise field of about $2.0\times10^{-2}$ picoTesla per square root Hertz. The expected signal-to-noise ratio is $1\div2\times10^{-2}$=50 (34 dB). Such spectrum also exhibits strong discrete components that were discriminated against by filtering in the EM-gradiometer receiver design.

David Middleton describes signal detection processes that are optimum in the sense of maximizing receiver threshold detection sensitivity. (*Introduction to Statistical Communication Theory*, Peninsula Publishing, Los Altos, Calif. 1987.) For a sinusoidal signal embedded in white electrical noise, synchronous detection maximizes the threshold detection sensitivity. The receiver detection sensitivity is given by, $$S_T^{10} = -164 + 10\log_{10}BW + 10\log_{10}NF \text{ dBM} \quad (7)$$

where BW is the noise bandwidth of the receiver in Hertz, and NF is the noise figure of the receiver.

The received signal $S_T^{10}$ produces a 10 dB signal-to-noise ratio in the receiver signal path. The first right-hand term (−164 dBM) represents a signal of 3.1 nanovolts that produces a signal-to-noise ratio of 10 dB in the receiver signal path. The far right-hand term represents the threshold detection sensitivity degradation due to receiver noise figure. Typically, a well-designed receiver will exhibit a noise figure near 2 dB. The middle term teaches that the noise bandwidth (BN) is the predominating factor in the receiver design problem.

The receiver threshold sensitivity increases as bandwidth is reduced. By synchronizing the receiver to the EM-wave illuminating the target, the receiver bandwidth can be made very small. Alternatively, a wider bandwidth can be used in the design where sampling and averaging can be used to achieve effective bandwidth. However, this type of system would not be able to discriminate the discrete spectrum.

As in FIG. 2, a gradiometer antenna array comprises of two ferrite-core magnetic dipole antennas (204 left and 208 right) electrically coupled and 180-degrees out of phase, e.g., in a differential mode of operation. For maximum primary wave cancellation, the antenna rod axes are aligned on the same axis. Then both are placed on a base line perpendicular to the intended target's trend. The magnetic dipole antennas 204 and 208 may also be connected in the summation mode of operation. In such case, the instrument would not operate as a gradiometer, but as a single magnetic dipole. The left magnetic dipole (LMD) 204 and right magnetic dipole (RMD) antenna 208 may be configured as vertical or horizontal magnetic dipoles. During the field tests, a horizontal magnetic dipole configuration was used. A central electronics enclosure and telescoping antenna assembly were enclosed in fiberglass. A center part of an antenna assembly tubing included a synchronization and calibration antenna (SMD) 206. Measured data was transmitted to a remote lap-top computer 230 via RF-modems 220 and 228. The system ran for six hours on a single lead-acid rechargeable battery.

The prototype gradiometer receiver was carried by an operator using a belt and shoulder strap. Data was recorded by the lap-top computer 230 for later reduction and graphing. The operator kept within a quarter mile, e.g., to guarantee a good radio link 224.

Figure 3:
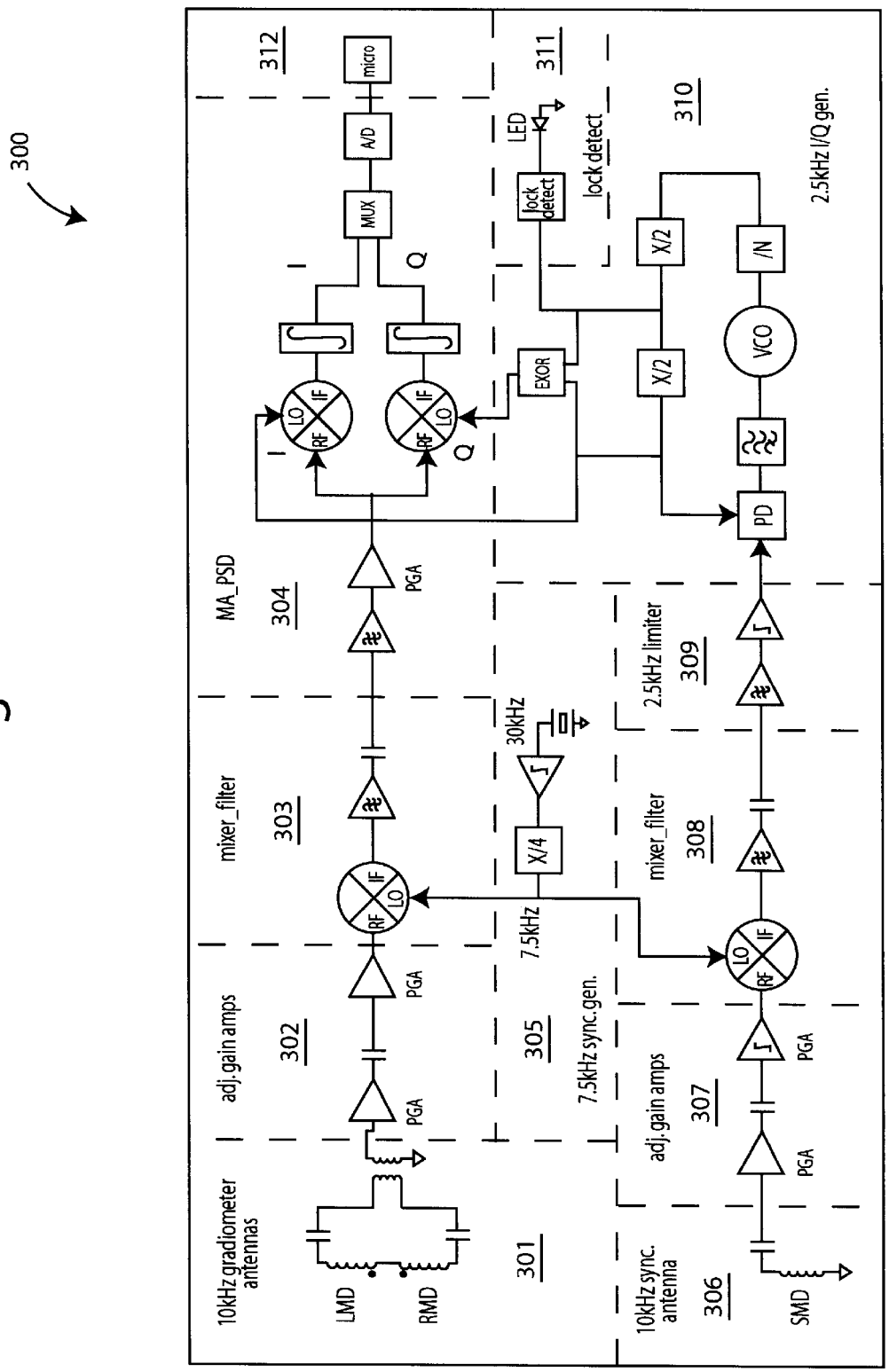
FIG. 3 is a block diagram of another EM-gradiometer embodiment of the present invention.

FIG. 3 represents a synchronized EM-gradiometer receiver 300, as is partitioned into twelve circuit elements 301–312. A synchronizing magnetic dipole (SMD) antenna 306 is a series-tuned induction coil followed by amplification gain greater than one hundred thirty-eight dB, e.g., a signal path gain factor of 7.94 million. A single conversion design is required to prevent self-oscillations by providing some gain at the sync frequency (60 dB) and remaining gain (78 dB) at the receiver intermediate frequency (IF).

An EM-wave magnetic field component threading the area of the induction coil of N-turns produces an electromotive force voltage (EMF) that is, $$emf = -N\frac{d\phi}{dt} \quad (8)$$

where, $\phi = BA$ is the magnetic flux in Webers and B is the magnetic flux density in Tesla (Weber per square meter). "A" is the effective area of the magnetic dipole antenna in square meters.

For a sinusoidal magnetic flux, the EMF voltage induced in an antenna is, $$emf = iN\omega(\mu_r A)B \quad (9)$$

where, N is the number of turns of the electrical conductor used in building the induction coil on the ferrite rod and $\mu_r$ is the relative permeability of the ferrite rod antenna.

A ferrite rod with an initial permeability of 5,000 and a length/diameter ratio of twelve achieves a relative permeability of one hundred twenty. The induced EMF increases with the first power of N and operating frequency ω, therefore, HAARP modulation frequency should be as high as possible to take advantage of ω in equation (9), but still low enough for the illuminating primary wave to encounter a low attenuation rate. The voltage also increases with the first power of effective area ($\mu_r A$) and magnetic flux density (β) of the illuminating EM-wave.

For a one inch diameter ferrite rod, the area is, $$A = \pi(0.0127)^2 = 5.07 \times 10^{-4} \text{ square meter.} \quad (10)$$

The HAARP ten kilohertz transmitter modulation of the electrojet signal is expected to produce a picoTesla ($10^{-12}$ Webers per square meter) signal causing the ferrite rod induction coil to produce a signal given by, $$emf = -i(850)(2\pi \times 10^4)([120]5.07 \times 10^4)(10^{-12}) = i32\ \mu V \text{ per picoTesla.} \quad (11)$$

Noise is expected to be 0.02 picoTesla in a 1-Hertz bandwidth. The signal-to-noise ratio is, $$SNR = \frac{32 \times 10^{-12}}{.02 \times 32 \times 20^{-12}} = 50. \quad (12)$$

The primary EM-wave illuminating the earth's surface is received by the series tuned sync magnetic dipole antenna (SMD) 306. An adjustable gain amplifier 307 forwards such to a mixer-filter 308 and a 2.5 kHz limiter 309. A signal lock detection circuit 311 includes an LED light. A microcomputer (MICRO) 312 is equivalent in use and function to notebook computer 230 in FIG. 2. The EMF signal of typically 32 μV per picoTesla is received by 10 kHz gradiometer antennas 301 comprising a left-hand magnetic dipole (LMD) and a right-hand magnetic dipole (RMD) antenna, and such EMF signal is then amplified by the programmable gain controlled amplifier (PGA) 302, e.g., 60 dB of gain. The mixer-filter 303 frequency. transposes the HAARP signal into a 2.5 KHz intermediate frequency (IF) signal, and provides additional gain of 78 dB. The IF signal is filtered and limited to form a square wave. The square wave signal is applied to the 2.5 kHz I/Q generator 310 which includes a phase-locked loop (PLL) comprising a phase detector (PD) and voltage controlled oscillator (VCO). The 2.5 kHz I/Q generator 310 produces in-phase (I) and quadrature (Q) sampling gate signals that respectively feed the local oscillator (LO) inputs of two synchronous mixers in the MA_PSD 304. Either an I or Q sample can be selected by a multiplexer (MUX) for digital conversion and sampling by an A/D converter. The selected samples are analyzed by MICRO 312.

The differential mode radiometer antenna, left magnetic dipole and right magnetic dipole, array produce an output signal ($e_o$), $$e_o = emf_1 - emf_2. \quad (13)$$

The EM-gradiometer array signal ($e_o$) is amplified by programmable gain control amplifier (PGA). The mixer-filter circuit results in the frequency transportation of the gradiometer signal to the 2.5 KHz intermediate frequency (IF) signal. The IF gradiometer signal is applied to the in-phase (I) and quadrature (Q) sampling gates.

The I and Q gate output signals are applied to separate integrators in MA_PSD 304. The output of each integrator is applied to an analog-to-digital converter (A/D). After integration, the rectified signals are represented by $$e_I = A e_o \sin \theta \quad (14)$$

and $$e_Q = A e_o \cos \theta \quad (15)$$

where, $Ae_o$ is the magnitude of the amplified gradiometer signal and A is the total signal path gain, and $\theta$ is the phase of the gradiometer array signal and the signal path phase shift. The output is applied to a microcomputer 312.

The squared magnitude of these signals is, $$M = \sqrt{e_I^2 + e_Q^2} = A e_o \quad (16)$$

and the phase by $$\theta = \tan^{-1} e_I / e_Q. \quad (17)$$

For detection and imaging, a compact horizontal magnetic dipole can be deployed along with a synchronized EM-gradiometer receiver as a surface-based system. When free access is difficult or impossible, HAARP transmitter and other standoff sources of EM-wave fields propagating in the earth-ionosphere waveguide can be depended upon to illuminate the surface overlying the underground facility.

The HAARP Ionospheric Research Observatory HAARP-HR transmitting system includes a phased-array antenna of 48 elements, with crossed-dipole antennas driven individually by 10 kW transmitters, resulting in a maximum radiated power of 960 kW. The earth-ionosphere waveguide provides a means of propagating EM fields to a UGF 100 site for site illumination and supports the quasi-TEM mode.

The three EM-wave field components of the quasi TEM-wave are a vertical electric field, a horizontal magnetic field component, and a horizontal electric field component. The horizontal electric and magnetic field components couple across the air-earth surface boundary, then propagate downward to illuminate UGF 100. Measurement of the horizontal "E" and "H" components is used in determining the electrical conductivity of the soil overlying the UGF 100. An indigenous transmitter can represent an opportunistic source of quasi TEM signals, e.g., the Navy very-low-frequency transmitter, located in Washington state with an output power of $2.3 \times 10^5$ watts. The quasi TEM-wave vertical electric field has been analytically determined to be 2.2 mV/m at the NTS. The experimental value was found to be 2.6 mV/m.

Aircraft equipped with horizontal magnetic dipole antennas are conventionally used in geophysical exploration. Very strong EM signals can be created by induction coils designed into chemical explosives, magnetohydrodynamic devices (MHDD). An MHDD was developed into a borehole radar logging tool for the oil/gas industry, but the industry did not adopt their use because of the explosive damage possible to the very costly-to-drill wells. But an MHDD detonated over a UGF 100 just prior to and during sampling could be an effective radio illumination source.

The synchronized EM-gradiometer receiver technology can be reconfigured into a ground-penetrating transponder (GPT) for remote sensing. UGF 100 response data could then be collected prior to a scout-team visit. The GPT preferably includes an S-band transmitter for transmitting data collected to standoff receivers. A number of GPT's may be placed along a survey line preferably crossing the heading of a adit and the UGF 100, and form a gradiometer array. Each GPT preferably further includes a seismic monitor, e.g., implemented with microelectromechanical system (MEMS) technology. The seismic data collected can help to estimate the depth of underground roadways, and to map the orientation of entries in the UGF 100. Position information can be provided by a global positioning system (GPS) receiver.

Figure 4:
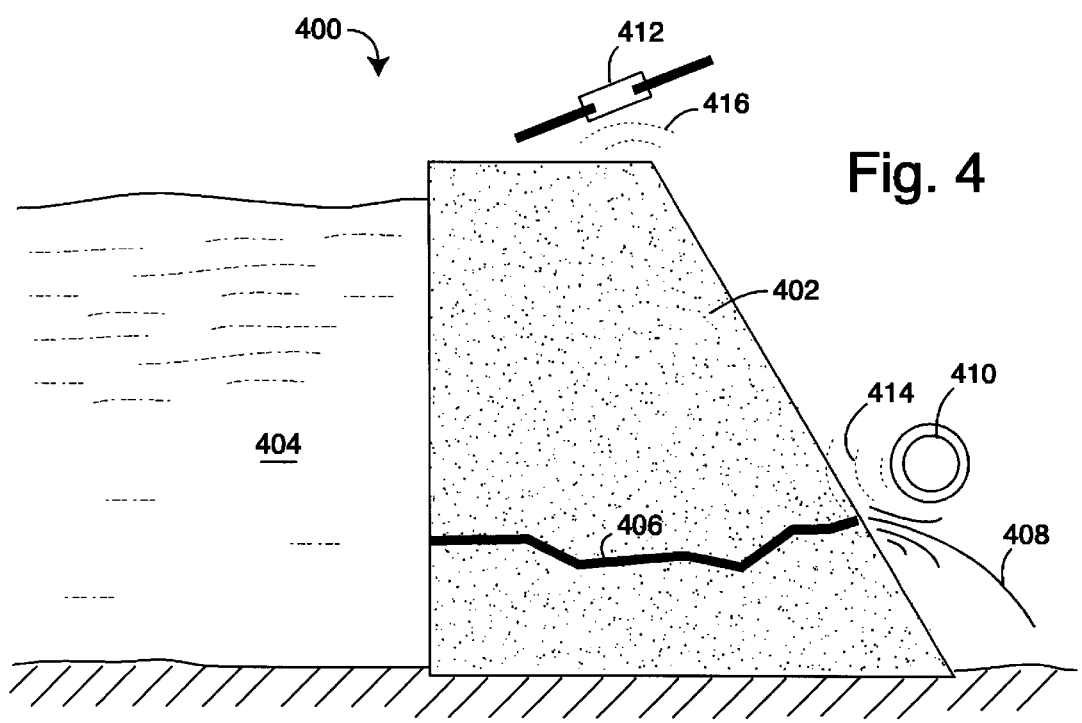
FIG. 4 is a cross-sectional view diagram of a leaking water dike, dam, or levee, showing how an illumination transmitter and EM gradiometer embodiment of the present invention can be used to find leaks and thereby prevent catastrophes.

FIG. 4 illustrates a method embodiment of the present invention in which a leak in a water dam or levee is detected, and is referred to herein by the general reference number 400. An earthen dam 402 has been constructed to hold back a body of water 404. A fissure 406 has developed that can ultimately lead to the catastrophic failure of the dam 402. Sometimes, a water spring 408 will be visible. A radio transmitter 410 is placed nearby and oriented so that a radio current will be absorbed in the fissure 406. An EM-gradiometer 412 is walked around overhead to survey the EM-field from different points. A radio transmitter signal 414 is selected that will provide the best possible reradiated radio signals 416. Once the radio survey data is collected, it is analyzed and evaluated in order to detect and plot fissure 406, if it exists, how large it is, and where it lies. Corrective measure are then taken by construction crews.

The several United States Patents referred to herein would be useful in various implementations of embodiments of the present invention, so each and all are incorporated herein by reference.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for detecting and characterizing underground man-made structures and facilities, the method comprising the steps of:

defining a minimum set of construction features common to all members of a class of underground man-made structures and facilities;

cataloging into a database at least one of an electronic signature and a photographic signature for each of said construction features in accessible members of said class of underground man-made structures and facilities;

radio illuminating individual ones of said minimum set of construction features included in an inaccessible underground man-made structure or facility;

collecting above ground a reradiation of radio signals produced by said individual ones of said minimum set of construction features;

comparing at least one of said electronic signature and said photographic signature for each of said construction features obtained in the step of collecting with corresponding ones stored in the step of cataloging; and deducing at least one of a location, depth, orientation, nature of overburden, and type for said inaccessible underground man-made structure or facility.

2. The method of claim 1, wherein:

the step of radio illuminating includes deploying a radio transmitter above ground proximate to said inaccessible underground man-made structure or facility.

3. The method of claim 1, wherein:

the step of radio illuminating includes radio illumination of said inaccessible underground man-made structure or facility by accidental, unintentional, inadvertent, fortuitous, unintended, or chance radio signals.

4. The method of claim 1, wherein:

the step of defining includes in said set of construction features at least one of adits, piping, wiring, ventilation systems, electrical power distribution, telephones, computers and electrically conductive water pathways.

5. The method of claim 1, further comprising the step of:

estimating a location of an adit by recognizing a set of radio signatures characteristic of utilities that serve said inaccessible underground man-made structure or facility.

6. The method of claim 1, further comprising the step of:

imaging said inaccessible underground man-made structure or facility.

7. The method of claim 1, further comprising the step of:

telemetering a plurality of measurements obtained in the step of collecting to a remote site for assessment of said inaccessible underground man-made structure or facility.

8. The method of claim 1, further comprising the step of:

disabling said inaccessible underground man-made structure or facility based on information developed in the step of deducing.

9. The method of claim 1, wherein:

the step of radio illuminating includes using primary electromagnetic (EM) waves; and the step of collecting above ground a reradiation of radio signals includes using secondary EM-waves polarized opposite to said primary EM-waves.

10. The method of claim 1, wherein:

the step of radio illuminating includes waveguide signal distribution effects of electrical conductors entering adits to said inaccessible underground man-made structure or facility.

11. The method of claim 1, wherein:

the step of radio illuminating includes opportunistic use of picoTelsa-range primary electromagnetic (EM) waves at said inaccessible underground man-made structure or facility generated by the High Frequency Active Aurora Research Project (HAARP) low frequency modulation of Earth's polar electrojets.

12. The method of claim 1, wherein:

the steps of collecting, comparing, and deducing produce in real-time at least one of said location, depth, orientation, nature of overburden, and type for said inaccessible underground man-made structure or facility.

13. The method of claim 1, further comprising the step of:

assessing changes that occur over time in at least one of said location, depth, orientation, nature of overburden, and type for said inaccessible underground man-made structure or facility that are obtained in the step of deducing.

14. The method of claim 1, wherein:

the step of radio illuminating includes using opportunistic standoff radio sources that reach said inaccessible underground man-made structure or facility with at least picoTesla signal power levels.

15. A method for finding underground mines, tunnels, shafts and leakage pathways from above ground electronic measurements, comprising the steps of:

assuming an underground facility is built in a particular way and decorated with a variety of standard features, wherein concrete reinforcing bar, rails, pipes, wire cables and leakage pathways are assumed to coexist;

illuminating with radio waves that penetrate the ground such that any electrically conductive materials constituent in said concrete reinforcing bar, rails, pipes, wire cables and leakage pathways reradiate characteristic secondary electromagnetic signals that can be observed on the surface; and collecting radio signal measurements above ground and combining the data obtained into pictures and estimates of the scope, orientation, nature, and character of said underground facilities.

16. The method of claim 15, further comprising the step of:

comparing any changes in said radio signal measurements collected over days, weeks, months, and years and interpreting any changes as being caused by at least one of deterioration, damage, upgrades, expansion, new construction, and design changes.

17. The method of claim 15, wherein:

the step of collecting is done from a car that is driven on the earth's surface above the underground facility, and said radio signal measurements are taken from a number of different known locations.

18. The method of claim 15, wherein:

the step of illuminating is provided by a radio transmitter attached to said car.

* * * * *